US008327192B2

(12) United States Patent  
Zimmer et al.

(10) Patent No.: US 8,327,192 B2  
(45) Date of Patent: Dec. 4, 2012

(54) METHOD FOR MEMORY INTEGRITY

(75) Inventors: Vincent J. Zimmer, Federal Way, WA (US); Michael A. Rothman, Puyallup, WA (US)

(73) Assignee: Intel Corporation, Santa Clara, CA (US)

(*) Notice: Subject to any disclaimer, the term of this patent is extended or adjusted under 35 U.S.C. 154(b) by 543 days.

(21) Appl. No.: 11/349,480

(22) Filed: Feb. 6, 2006

(65) Prior Publication Data

US 2007/0186279 A1 Aug. 9, 2007

(51) Int. Cl.
*G06F 11/00* (2006.01)
(52) U.S. Cl. .......................... 714/42; 709/203
(58) Field of Classification Search ............... 714/42
See application file for complete search history.

(56) References Cited

U.S. PATENT DOCUMENTS

| | | | |
|---|---|---|---|
| 6,513,095 B1* | 1/2003 | Tomori | 711/103 |
| 6,856,619 B1* | 2/2005 | Haugseth et al. | 370/389 |
| 7,120,858 B2* | 10/2006 | Zak et al. | 714/807 |
| 7,248,514 B2* | 7/2007 | Nishihara et al. | 365/200 |
| 7,418,487 B2* | 8/2008 | Andreas | 709/220 |
| 7,493,424 B1* | 2/2009 | Bali et al. | 710/22 |
| 7,509,419 B2* | 3/2009 | Elnozahy et al. | 709/225 |
| 7,523,216 B1* | 4/2009 | Christopher | 709/236 |
| 7,523,378 B2* | 4/2009 | Dammann et al. | 714/758 |
| 7,917,597 B1* | 3/2011 | Lentini | 709/212 |
| 2003/0204609 A1 | 10/2003 | Anderson et al. | |
| 2004/0010612 A1* | 1/2004 | Pandya | 709/230 |
| 2004/0139253 A1* | 7/2004 | Perego et al. | 710/71 |
| 2004/0255286 A1 | 12/2004 | Rothman et al. | |
| 2005/0071623 A1 | 3/2005 | Goud et al. | |
| 2005/0114614 A1 | 5/2005 | Anderson et al. | |
| 2005/0286513 A1* | 12/2005 | King | 370/389 |
| 2006/0045005 A1* | 3/2006 | Blackmore et al. | 370/216 |
| 2006/0080579 A1 | 4/2006 | Rothman et al. | |
| 2006/0095505 A1* | 5/2006 | Zimmer et al. | 709/203 |
| 2006/0146814 A1 | 7/2006 | Shah et al. | |
| 2006/0155880 A1* | 7/2006 | Elnozahy et al. | 710/1 |
| 2006/0155882 A1* | 7/2006 | Jochemsen et al. | 710/3 |
| 2006/0168196 A1 | 7/2006 | Herbert et al. | |
| 2006/0190798 A1* | 8/2006 | Korkishko et al. | 714/758 |
| 2006/0253749 A1* | 11/2006 | Alderegula et al. | 714/718 |
| 2007/0061634 A1* | 3/2007 | Marisetty et al. | 714/48 |
| 2007/0067698 A1* | 3/2007 | King et al. | 714/763 |
| 2007/0130364 A1* | 6/2007 | Joglekar et al. | 709/238 |
| 2007/0156951 A1* | 7/2007 | Sultan et al. | 711/103 |
| 2009/0024827 A1* | 1/2009 | Davis | 711/216 |
| 2010/0049821 A1* | 2/2010 | Oved | 709/212 |

OTHER PUBLICATIONS

Kgalvin, Wikipedia, Aug. 21, 2005.*
Shah, et al. "Offloading Data Path Functions," U.S. Appl. No. 11/106,799, filed Apr. 15, 2005.

(Continued)

*Primary Examiner* — Kamini Patel
(74) *Attorney, Agent, or Firm* — Barnes & Thornburg, LLP

(57) ABSTRACT

A method and apparatus is described herein for performing a remote memory integrity function on a remote computing system. A memory integrity module in a first system performs a memory integrity function, such as a memory test, memory update, memory dump, inventory, or other integrity function, on a second networked system using RDMAs to interface with a client memory integrity module in the second networked system.

26 Claims, 3 Drawing Sheets

OTHER PUBLICATIONS

Rothman, et al. "Response to Wake Event While a System is in Reduced Power Consumption State," U.S. Appl. No. 11/170,632, filed Jun. 28, 2005.

Intel Corporation et al., "IPMI—Intelligent Platform Management Interface Specification Second Generation v2.0," May 5, 2005, retrieved from http://www.intel.com/design/servers/ipmi/IPMiv2_0_rev1_0_markup_2.pdf, 622 pages.

InfiniBand Trade Association, "InfiniBand Trade Association Home Page," Jan. 13, 2006, retrieved from http://www.infinibandta.org, 1 page.

Intel Corporation, "Intel Active Management Technology," Jan. 14, 2006, retrieved from http://www.intel.com/technology/manage/iamt/, 2 pages.

Intel Corporation, "Intel I/O Acceleration Technology," Feb. 6, 2006, retrieved from http://www.intel.com/technology/ioacceleration/, 2 pages.

Intel Corporation, "Intelligent Platform Management Interface," Feb. 6, 2006, retrieved from http://www.intel.com/design/servers/ipmi/, 4 pages.

* cited by examiner

METHOD FOR MEMORY INTEGRITY

FIELD

This invention relates to the field of networked accesses between computing systems and, in particular, to ensuring memory integrity in remote computing systems.

BACKGROUND

Computer systems have quickly become the center of numerous operations performed in households throughout the world. Previously, a computer was used only for computing operations; however, uses for computers have progressed from this simple model into an electronics hub. A few examples of this progression include using a computer as a media center, a TV, a stereo, a picture repository, a data center, and a server for personal, informational, and commercial applications. As a result, computers as well as the networks they are connected to have grown immensely. For example, the internet has become one of the most prolific resources for information and retail.

However, as the internet and networks within companies continue to increase, the computing resources required to operate at high speeds have also drastically increased. Previously a single server or small data center was able to serve the general public. Yet, websites and networks have become so popular and frequently hit, that data-centers have become much more complex. Often a data-center includes a back-end with single or multiple index servers that maintain a central repository of information/data, as well as a front-end that interfaces with outside clients requesting the data. Consequently, to meet the demand on storage capacity and access times, many networks employ the usage of server racks, which have any number of servers networked together, or a large grouping of servers.

Typically, there is a central authority server or other central server that recognizes new servers or racks. To ensure the integrity of a new machine, the memory of the new machine is often tested by downloading a servicing agent to perform a local memory test. This local test creates two potential problems: (1) a machine that is not healthy may not have the capacity to adequately and accurately perform a self-check; and (2) there is often a large overhead in repeating the self-check for each new machine that is not easily automated.

Additionally, networked machines are typically limited to communicating with each other through traditional memory accesses, which impose a large load on a machine's processor and memory, as memory accesses must be arbitrated through an operating system's kernel and application space. This process of mediating a remote access is typically used to ensure trust and reliability, but costs valuable processor execution time and memory space.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific network interface devices, controllers, remote direct memory access (RDMA) components, etc. in order to provide a thorough understanding of the present invention. It will be apparent, however, to one skilled in the art that these specific details need not be employed to practice the present invention. In other instances, well known components or methods, such as specific network implementation, server configuration, manufacturing techniques, as well as program code, have not been described in detail in order to avoid unnecessarily obscuring the present invention.

The method and apparatus described herein are for performing a memory integrity function on a remote/networked computing system, such as a client server, which is specifically discussed in reference to servers networked together. However, the methods and apparatus for managing are not so limited, as they may be implemented on or in association with any network or plurality of integrated circuit devices, such as a home network with a notebook and a desktop machine or a wireless network between a desktop machine and a personal digital assistant (PDA).

Computing Systems

Figure 1:
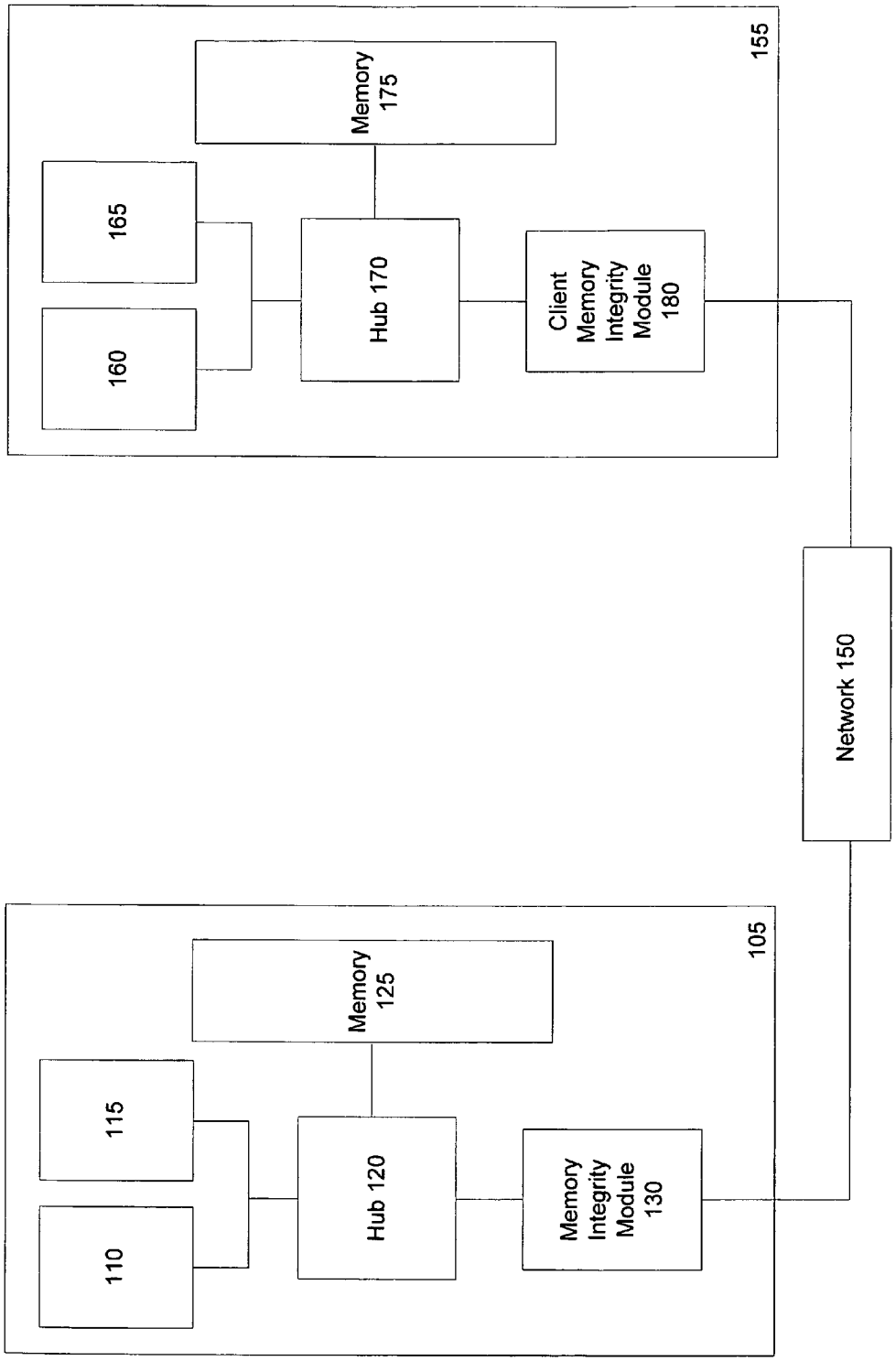
FIG. 1 illustrates an embodiment of two computing systems coupled through a network including memory integrity modules.

Referring to FIG. 1, two networked computing systems including memory integrity modules are illustrated. Computing system 105 is connected/coupled to networked computing system 155 through network 150. Network 150 is discussed in more detail below in the network section. A computing system includes any machine operable to execute code/instructions or operate on data, as well as capable to be networked to another machine. Specific examples of computing system 105 include a computer, a server, a central authority server, a networked client server, a rack server, a desktop computer, a notebook computer, a personal digital assistant (PDA), a cell-phone, and an embedded system.

In one embodiment, computing system 105 is a central authority server to manage other computing systems coupled to network 150, such as networked computing system 155. Here, computing system 105 includes a plurality of processors, such as processor 110 and 115. Processors 110 and 115 may be physical processors, logical processors, as well as physical processors including multiple logical processors, such as a multi-threaded multi-core processor. Here, processors 110 and 115 are coupled to system memory 125 and memory integrity module/agent 130 through hub 120. Memory integrity module 130 is discussed below in more detail in the memory integrity module section. Hub 120 includes at least a controller for communicating with memory 125 and other interconnect/network devices. For example, hub 120 is a chipset, which includes two controller hubs: (1) a memory controller hub (MCH) to communicate with memory 125; and (2) an interconnect/interface controller hub (ICH) to communicate with peripheral devices.

Memory 125 may be any device for storing data elements, instructions, code, logical values, or other information. In one embodiment, memory device 125 is a random access memory (RAM), such as a static RAM (SRAM) or dynamic RAM (DRAM), device. Unlike a non-volatile memory, a RAM device does not usually store values, when no power is supplied to the device. Examples of common RAM devices include, double-data rate (DDR) RAM, synchronous DRAM (SDRAM), non-synchronous DRAM, pseudo-SDRAM (PSRAM) and extended data out DRAM (EDO RAM).

As another example, memory device 125 is an non-volatile memory, such as an erasable programmable read-only memory (EPROM). An EPROM and an electrically erasable PROM or EEPROM device is often referred to as a flash device, since the device is "flashed" or electrically erased/ programmed. The two common types of flash memory include NOR and NAND flash memory, which refers to the types of transistors and memory array physical organization used in the device. Both types of flash memory store information in an array of transistors, which are referred to as cells. Traditionally, each cell stores 1-bit of information per cell; however, multi-bit cells are also currently used to store multiple bits per cell of a flash device. Other examples of memory device 125 include a read only memory (ROM), a long-term storage drive, a hard drive, and a portable storage device.

Networked computing system 155 includes similar components as computing system 105 having processor 160 and 165 coupled to memory 175 and client memory integrity module 180 through controller hub 170. Note that although computing system 105 and 155 are illustrated as having potentially similar components, either may have any collection or configuration of components within a device/system described above. For example, computing system 105 is a central authority server, while computing system 155 is a networked client server to be managed by central authority server 105. As another example, computing system 105 is a desktop machine and networked computing system 155 is a PDA wirelessly networked to desktop machine 105, where the PDA has a host processor, such as an embedded processor, and flash memory for data storage.

Network

As referred to above, network 150 may be any medium, such as a tangible medium, or propagated signals, for networking of two computing systems. As a first example, network 150 is a network connecting two servers within a data-center. A network in a data-center may include routers, switches, hubs, local-area-network logic, cables, and/or wireless connections to create a network both between back-end index and management servers, as well as to/between front-end servers. As another example, network 150 is a wireless network, where computing system 105 includes or is coupled to a wireless adapter to transmit/receive signals wirelessly to/from computing system 155. Other examples of network 150 include the Internet, local connection between two or more computing systems, a local-area network, a physically remote network connection, a network between a plurality of servers, as well as other connections between computing systems.

As stated above, physically remote often refers to an offsite location; however, the term remote as used herein may refer simply to a computing machine that is networked with another machine and need not be physically remote. For example, a first server, which is located in the same physical room as a second server and connected to the second server through a network, is referred to as a remote server. When the first server accesses the memory of the second server it is typically referred to as a remote memory access, as the first server is accessing remote memory not locally present within the first server.

Memory Integrity Module/Agent

As illustrated, both computing system 105 and 155 include a memory integrity module. As to not obscure the discussion, memory integrity module (MIM) 130 will be discussed in reference to performing/initiating a memory integrity function on a remote/networked computing system, while client memory integrity module (CMIM) 180 will be discussed in reference to receiving remote direct memory access (RDMA) requests and performing memory integrity functions on local memory, such as memory 175. However, note that both MIM 130 and CMIM 180 may have the capability to perform the functions of the other. For example, in another instance, CMIM 180 is performing a memory integrity function on another networked computing system.

A module, such as MIM 130 and CMIM 180, may be implemented in hardware, software, firmware, or any combination thereof. Commonly, module boundaries vary and functions are implemented together, as well as separately in different embodiments. As an example, which is discussed in more detail below, MIM 130 is to perform remote direct memory accesses (RDMAs) and memory integrity functions. In this case, hardware, such as a controller on a network interface card (NIC), a cross between hardware and software, such as an enhanced transport control protocol/internet protocol (TCP/IP) stack or an I/O acceleration module, a software application, such as an operating system or application, as well as other hardware and firmware may all be included in MIM 130 to accomplish these tasks. This example illustrates that, not only may modules vary across hardware, firmware, and software boundaries, but they also may vary across other module boundaries.

In one embodiment, MIM 130 performs a remote direct memory access (RDMA) to a memory such as, memory 175 in networked computing system 155. The term RDMA often refers to a communications technique that allows data to be transmitted from the memory of one computing system to the memory of another networked computing system without a call to an operating system (OS) kernel. As discussed below, RDMA may also allow for communication between networked computing systems without extensive processor execution time or extensive buffering.

As a first example, an RDMA includes memory integrity module 130 posting or writing values/information to memory 175 in networked computing system 155 without executing a call to a kernel in computing system 105. In the alternative to a post or write, an RDMA may also include reading or getting the contents of a location in memory 175 without executing a call to a kernel in computing system 105. As a specific illustrative example, a network interface card (NIC), which is coupled to hub 120 transfers data or values from an application memory space in memory 125 directly to memory 175 in networked computing system 155 without copying data between the application memory space and a kernel. Therefore, commands are issued from user-level or an application space directly to a NIC and over a network to a networked NIC in a networked client computing system.

An RDMA performed by MIM 130 typically references a section of memory 175 to be accessed. A section of memory 175 includes a reference to a single specific location, as well as to a group/range of locations. For example, a reference to a section of memory may include a virtual memory address of a specific location, a range of addresses, an offset from an address, a beginning address location, or an ending address location. Therefore, in the example above, where an RDMA is performed by MIM 130 to write into memory 175 of networked computing system 155, a NIC as part of MIM 130, includes in the RDMA a reference to a virtual memory address or range of addresses within memory 175 to write the values/data to. Essentially, the direct access of another computing system's memory typically includes a specific reference to where the information is to be written to or read from.

One example of an interconnect/networking architecture that supports RDMA technology is Infiniband. Infiniband is a high performance, switched fabric interconnect standard for servers. More information about Infiniband may be found on the homepage for the Infiniband Trade Association.

Figure 2:
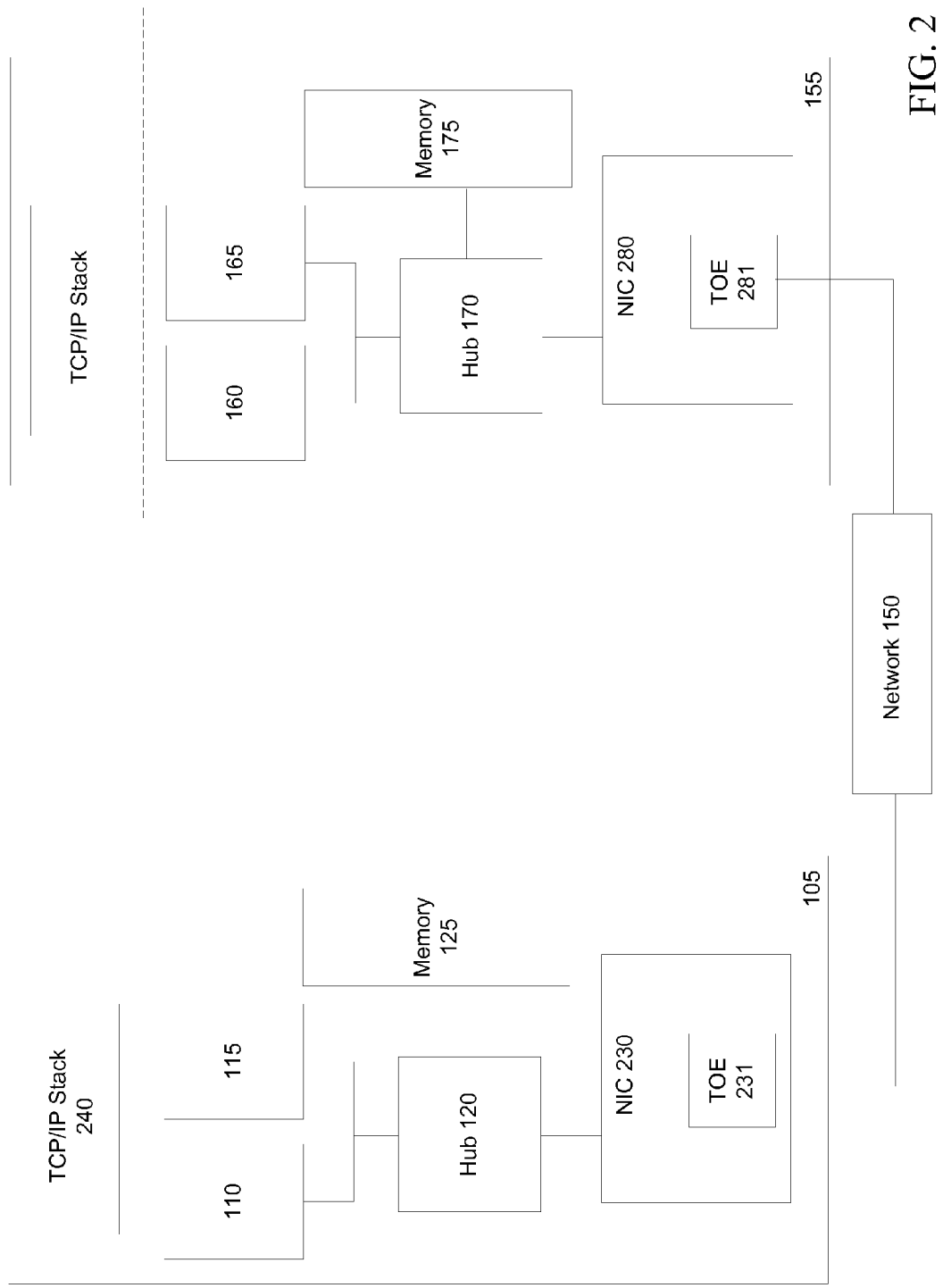
FIG. 2 illustrates another embodiment of two computing systems coupled through a network including memory integrity modules.

Turning quickly to FIG. 2, one embodiment is illustrated, where a direct memory access (DMA) mechanism, such as RDMA technology, is implemented with some input/output (I/O) offload engine, such as TCP/IP offload engine (TOE) 231 to offload at least some processing of a TCP/IP flow from host processors, such as processor 110 and 115. TOE 231 may be implemented in a host bus adapter, a network interface card (NIC), such as NIC 230, or elsewhere in computing system 105 to shift protocol stack processing from host processors 110 and 115. For example, implementation of TOE 231 silicon on NIC 230 in computing system 105 potentially relieves a CPU from some protocol instruction execution and interrupt handling. Often TOE 231 is implemented with an application-specific integrated circuit (ASIC), but TOE 231 may be implemented in any hardware, software, or firmware.

An RDMA ready architecture may also implement input/output (I/O) acceleration to accelerate TCP/IP processing, protocols and accesses. In one embodiment, computing system 105 implements an I/O acceleration module. As a first example, an I/O acceleration module includes: (1) a data path and a control path, which is separate from the data path, to process TCP/IP headers; (2) a network stack, such as TCP/IP stack 240, partitionable across multiple processors, such as host processors 110 and 115, as well as TOE 231; and (3) logic to perform asynchronous low-cost copies.

Partitioning applications from the operating system workloads that intrude on an application is often referred to as network stack affinity/partitioning, and potentially reduces operating system (OS) intrusion on the performance of the application. I/0 acceleration may also include protocol stack optimization, which refers to numerous potential changes to the traditional TCP/IP stack including: (1) separate data paths and control paths to optimize packet payload header processing; (2) optimizing exception testing to reduce packet path length; and (3) utilizing data structures that are cache-aware to optimize cache hits. Another feature of I/O acceleration is an asynchronous low-cost copy, where logic is provided to trap system memory reads/writes and carry them out independent of a processor to free up processing cycles. Other functions and features of I/O acceleration, such as light weight threading and direct cache accesses, may also be implemented.

Returning to FIG. 1, in another embodiment, MIM 130 includes an active management technology (AMT) engine to implement active management technology. AMT is a hardware and firmware based solution that stores hardware and software information in non-volatile memory and allows a user to discover assets, even while the system is off. In one embodiment, features of AMT include out-of-band system access to allow remote management of computing systems regardless of power, remote proactive alerts and recovery through early detection and reboots, remote software version checking, and remote virus protection/update.

Other features and modules may be implemented in MIM 130, such as basic input output software (BIOS) handlers and routines to perform functions during boot. In fact, MIM 130 potentially includes a detection module to determine/detect when a new computing system, such as networked computing system 155, comes online, to perform the memory integrity functions, which are discussed below, during boot before an operating system is loaded on networked computing system 155. Another embodiment of a controller that may be included in MIM 130 is a baseboard management controller (BMC). A BMC is often implemented in a system with an intelligent platform management interface (IPMI) to manage interfaces between system hardware and software, as well as other common management functions such as a management interface, an event generator, a message handler, a system event log (SEL) interface, a sensor, a sensor data record repository, OEM commands, and other functions.

In one embodiment, MIM 130 is to perform/initiate a memory integrity function on memory 175 in networked client computing system 155. The memory integrity function includes an RDMA to memory 175, which may be an RDMA read or write to memory 175. A memory integrity function is any memory test, inventory, save, update, inventory, rollback, or other integrity function including the RDMA read o write to memory 175.

In one embodiment the memory integrity function is a memory integrity test. Here, server 105 is to perform a memory test on server 155's memory, i.e. memory 175. A memory test may include any test for validating the physical storage or validity of content in memory 175. As an illustrative example, a memory test is performed as follows below.

Assume server 155 has just come online, i.e. booting up, and is recognized on network 150 by central authority server 105. Also assume that central authority server 105 determines that server 155 is RDMA ready, as it includes CMIM 180. MIM 130, which may include an application space in memory 125, sets up a pattern of values to be written to memory 175 as part of the memory test. In fact, the application space in memory 125 may be for a memory test application executing on server 105. The pattern of values may be any pattern of values. In one embodiment, the pattern is an alternating pattern to make validating memory 175 potentially easier.

MIM 130, which may also include a NIC with a TOE, performs an RDMA to write the pattern of values to a first section of memory 175. As stated above, the reference to the section of memory 175 may be a reference to a single or range of linear or physical addresses. It is also worth noting, that not every line within a range of addresses has to be written to, as the RDMA may reference a sequence of lines to write to/test. For example, every log base 2 line within the section of memory 175 is written to and then read back from.

When CMIM 180 receives the RDMA from server 105, the pattern of values is written/posted to the section of memory 175 referenced by the RDMA. Note that the pattern of values may be a short pattern that is to be repeatedly written to the section of memory 175. The original RDMA or another RDMA may then request the contents of the section of memory 175 to be read back out. The values may then be compared to the values written into memory 175 in either client server 155 or central authority server 105 to ensure the section of memory 175 is valid, i.e. stores and writes back out the correct values. Previously, in an unhealthy machine a write, read, and comparison memory test, such as the one described above, may not provide valid results, as client server 155 may not be healthy enough to test itself.

To continue the example from above, after the first pattern of values are written to the first section of memory, another RDMA from server 105 requests, reads, or gets the contents of another section or address in memory 175, to ensure that upon the write to the first section of memory 175, another location in memory 175 did not change. Essentially, this part of the example demonstrates a memory test that verifies the accuracy of addressing and storing in memory 175.

In another embodiment, the memory integrity function is a memory update of memory 175, which may be a non-volatile memory, such as a flash device, as described above. Previously, flash devices storing BIOS code or management information, did not have to be frequently flashed; however, as the contents of these flash devices have increased the need to update them has also increased. Therefore, sometimes flash devices must be updated to install important updates, security patches, and other code integral to memory and system integrity. Instead of downloading new code to be programmed into the flash device, the device is updated by one or more RDMAs from another networked computing system, such as computing system 105.

For example, assuming memory 175 is a flash device that needs to be updated. MIM 130 determines what code needs to be programmed into what sections/locations in flash device 175. MIM 130 performs a RDMA to write the updated code to the sections/locations in flash device 175, and the flash is updated efficiently without having to execute a call to an operating system kernel or excessively tie up system resources. To accomplish this RDMA, the memory space of flash device 175, may be remapped as part of the address space visible to CMIM 180, which is commonly known from the remapping of memory to be visible to a device within a memory map.

Other examples of memory integrity functions include: (1) a roll-back where contents of memory 175 restored to a previous state through an RDMA, which often occurs after changes that result in a failure; (2) a snapshot where content of memory 175 are captured and stored either locally or remotely in short-term or long-term storage to save previous states of memory 175 in case a roll-back is required; (3) a crash-dump save where either central authority server 105 is crashing and needs to store current contents of memory 125 in memory 175, or inversely, system 155 is crashing and needs to dump memory 175's contents into storage on server 105; and (4) an inventory where types, versions, and/or specific hardware or software is logged to record a current system configuration or memory configurations. These memory integrity functions are exemplary, as other functions to ensure memory or system integrity including an RDMA may be performed.

In addition, CMIM in conjunction with other modules or components may perform security and key verification. For example, when system 155 first comes online, central authority server 105 performs a security check to verify that server 155 is authorized to be on network 150. From the other perspective, when an RDMA to access memory 175 from server 155 is received, CMIM 180 may perform a security check, such as key verification, to ensure server 105 is authorized to perform an RDMA to memory 175.

Client Memory Integrity Module/Agent

Client memory integrity module (CMIM) 180 may include all the features and functionality of MIM 130, as described from above. In fact, in one embodiment MIM 130 and CMIM 180 are identical agents in each server to enable scalability and provide easier manufacturing/maintenance. However, CMIM 180 is not required to be the same as MIM 130.

CMIM 180 is to receive a remote direct memory access (RDMA) from a networked computing machine, such as computing system 105. Essentially, CMIM 180 services or carries out the memory integrity function performed/initiated by computing system 105. For example, in an embodiment where the memory integrity function is a memory integrity test, CMIM 180 receives the RDMA referencing a first range of lines of the plurality of lines in memory 175 to be tested and a first set of values to be posted to the first range of lines. CMIM 180 performs the write to memory accordingly. As an example, a NIC 280 in server 155 receives the RDMA from MIM 130. The NIC 280 may process the headers and packet information with a controller, such as a TOE 281, and then buffer the values in buffers, such as pre-post buffers. The values are then written to memory 175, which is often done through a controller hub, such as controller hub 170.

Therefore, CMIM 180 essentially services the memory integrity function by receiving and fulfilling the RDMA, whether the memory integrity function is a memory integrity test, a dump, an inventory, a roll-back, a snapshot, a memory update, or another memory integrity function. Continuing the memory integrity test example from above, CMIM 180 posts the alternating values to every $\log_2$ line within the section of memory 175 to be tested, gets the contents of the memory section, after posting, to ensure the memory is valid, and optionally gets the contents of a second range of the memory to ensure the second range did not change upon the post to the first range. Also note that CMIM 180 may perform an RDMA to post the contents of memory 175 into a memory in computing system 105, if computing system 105 is doing the comparison to ensure memory 175 is valid and healthy.

Figure 3:
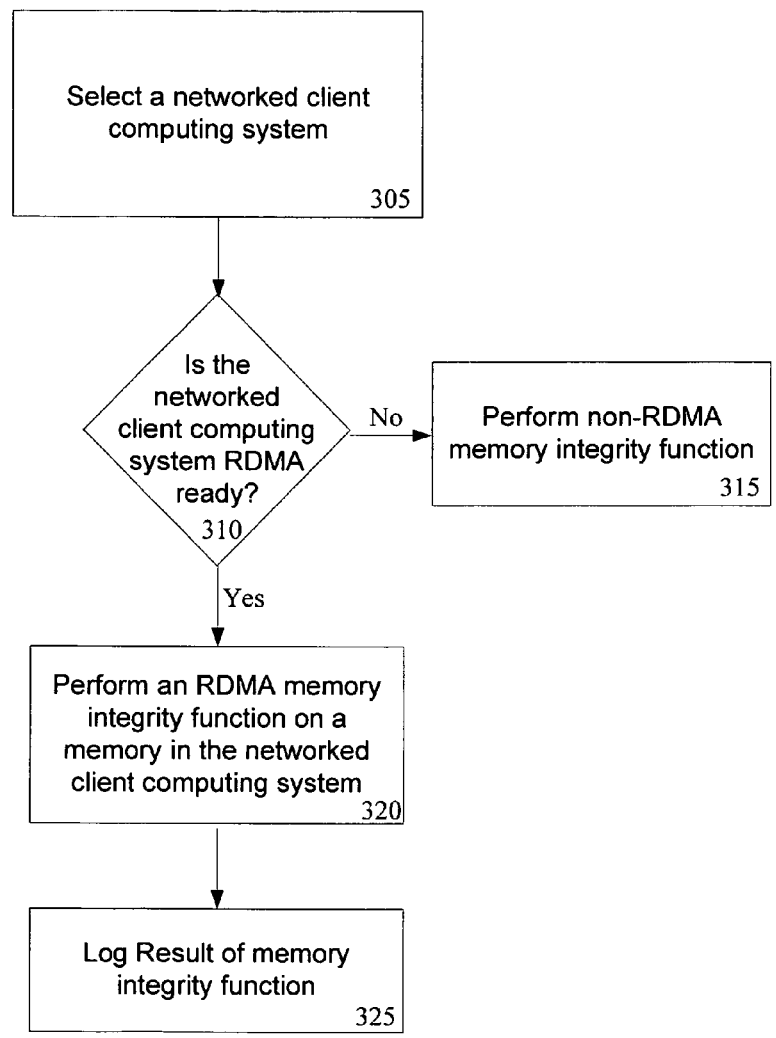
FIG. 3 illustrates an embodiment of a flow diagram for performing a remote direct memory access (RDMA) function on a networked computing system.

An Embodiment of a Flow Diagram for a Method of Performing a Remote Memory Integrity Function Turning to FIG. 3, an embodiment of a flow diagram for a method of performing a remote memory integrity function is illustrated. In flow 305, a networked client computing system is selected. The networked client computing system may be any system capable of being networked, as described above.

Selecting a networked client computing system includes any referencing of the networked client computing system. For example, loading a machine address associated with the networked client computing system in a storage element, such as a buffer or register, is included in selecting a networked client computing system. In another embodiment, the networked client computing system is detected on a network upon boot of the networked client computing system. A machine address associated with the networked client computing system is determined and the machine address is selected or referenced before or during a RDMA to the networked client computing system.

In decision flow 310, it is determined if the networked client computing system is remote direct memory access (RDMA) ready. Essentially, this flow is deciding whether the client computing system is able to handle an RDMA. This determination may be made by a series of acknowledgment or protocol signals, as well as a signal initially generated by the client computing system during boot. In one embodiment, the server determining if the client computing system is RDMA ready includes receiving a first signal, if the networked client computing system is RDMA ready and receiving a second signal, if the networked client computing system is not RDMA ready.

If the networked client computing system is not RDMA ready, then a non-RDMA memory integrity function is performed in flow 315. As one example, the traditional downloading of a servicing agent is performed, and the servicing agent runs a local memory test on the networked client computing system.

However, if the networked client computing system is RDMA ready, a RDMA memory integrity function is preformed on a memory in the networked client computing system in flow 320. As stated above, the memory integrity function includes a function for system or memory integrity using a RDMA, such as a memory integrity test, a dump, an inventory, a roll-back, a snapshot, a memory update, or other integrity function.

In one embodiment, where the memory integrity function is a memory integrity test, a pattern to write to and read from the memory is setup, which may be done in a memory integrity module, as well as in application or other routine being executed. A portion of the memory to test is determined and a RDMA is transmitted to the networked client computing system to initiate: a write to the portion of the memory; and a read from the portion of the memory to ensure the write to the portion of the memory was validly stored.

Lastly, the results of the memory integrity function are logged. In the case of a memory integrity test, the results may include the locations of memory that are valid or invalid, the health of the memory in the networked client computing system, the RDMA ready status of the networked client computing system, or other resulting information. In the case of a snapshot, roll-back, or inventory logging may include storing the contents of the snapshot or inventory in short-term or long-term storage, which is either local or remote, as well as the effectiveness of the snapshot, inventory, or roll-back.

An Embodiment of an Article of Manufacture

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

As illustrated above, a central authority server would be allowed full remote authority access over a target machine with the associated performance, trust, state, and reliability considerations, and without the previous adverse impacts of self-verification and extra execution cycles. In addition, the use of I/O acceleration and offloading engines may be leveraged to perform more efficient memory integrity functions. As a consequence, machines may be tested remotely, which potentially removes the adverse consequences of an unhealthy machine performing local memory integrity functions.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a memory integrity hardware module to be included within a local computing system, the memory integrity hardware module to generate a memory integrity access request to a memory in a networked computing system without a call to a kernel executing in the local computing system, wherein the memory integrity access request is to initiate performance of a memory integrity function on the memory in the networked computing system in response to receiving the memory integrity access request, and wherein the memory integrity function includes a function selection from a group consisting of storing a snapshot of a first section of memory of the local computing system in the networked computing system for roll-back, storing a snapshot of contents from the networked computing system in the first section of memory in the local computing system for rollback, and storing values from the first section of memory in the local computing system to another section of memory in the local computing system for rollback, the memory integrity access request is to include a remote direct memory access (RDMA) with a reference to the first section of memory.

2. The apparatus of claim 1, wherein the memory integrity hardware module includes a network controller on a network interface card (NIC), and wherein the network controller is to generate the memory integrity access request to the memory in the networked computing system in response to user-level software executing in the local computing system issuing the memory access to the network controller without a call to a kernel executing in the local computing system.

3. The apparatus of claim 2, wherein the memory integrity hardware module also includes a TCP/IP offload engine (TOE), wherein the TOE is also located on the NIC.

4. The apparatus of claim 3, wherein the memory integrity hardware module further includes an (I/O) acceleration hardware module, the I/O acceleration hardware module including a data path and a control path separate from the data path to process TCP/IP headers, a network stack partitionable across multiple processors, and logic to perform asynchronous low-cost copies.

5. The apparatus of claim 1, wherein the memory integrity hardware module includes an active management technology (AMT) engine, basic input/output software (BIOS) routines, and application code executable in an operating system space.

6. The apparatus of claim 1, wherein the memory integrity hardware module includes a baseboard management controller (BMC).

7. The apparatus of claim 1, wherein the reference to the first section of the memory includes a virtual memory address and a range of addresses.

8. The apparatus of claim 1, wherein the memory in the networked computing system is a non-volatile memory, and wherein the memory integrity function further includes a memory update to program the non-volatile memory.

9. The apparatus of claim 1, wherein the local computing system includes a central authority server, and wherein the networked computing system is a server networked with the central authority server.

10. The apparatus of claim 9, wherein the memory integrity hardware module is also to verify that the networked server is an authorized server.

11. An apparatus comprising:
a system memory including a plurality of lines;
a client memory integrity agent (CMIA) to receive a remote direct memory access (RDMA) from a networked computing machine referencing a first range of lines of the plurality of lines in the system memory to be tested and a write-set of values to be posted to the first range of lines; wherein the CMIA, in response to receiving the RDMA, is to
post the write-set of values to the first range of lines;
in response to the post of the write-set of values to the first range of lines,
read the first range of lines to form a read set;
compare the write-set of values to the read set of values to ensure the first range of lines are valid; and
read a second range of lines, which does no overlap the first range of lines, to ensure the post of the write-set of values to the first range of lines did not change the second range of lines.

12. The apparatus of claim 11, wherein the CMIA includes a controller selected from a group consisting of an active management technology (AMT) controller, a baseboard management controller (BMC), a host bust controller, and a networking controller.

13. The apparatus of claim 12, wherein the CMIA also includes a security module to verify a key value received with the RDMA to authenticate the RDMA.

14. The apparatus of claim 11, wherein posting the write-set of values to the first range of lines includes writing the write-set of values to every log base 2 line within the first range of lines.

15. The apparatus of claim 14, wherein the CMIA is to read the second range of lines.

16. The apparatus of claim 11, wherein the system memory is a random access memory (RAM).

17. A system comprising:
a first computing system including a memory integrity agent (MIA) to initiate a memory integrity function on a memory in a second computing system, wherein the memory integrity function includes a remote direct memory access (RDMA) to the memory in the second computing system, wherein the memory integrity function is to include a memory integrity test and the RDMA is to include a reference to a first section of the memory to perform the memory integrity test on and a test pattern of values to be written to the first section of memory as part of the memory integrity test; and
the second computing system networked to the first computing system, wherein the second computing system includes a client memory integrity agent (CMIA) to perform the memory integrity function on the memory based on receiving the RDMA, wherein the CMIA to perform the memory integrity function includes the CMIA to write the test pattern of values to the first section of memory, read the first section of memory to obtain a read pattern after writing the test pattern, and read a second section of memory after writing the test pattern to ensure the test pattern and read pattern are the same and that the write of the test pattern did not change the second section of memory.

18. The system of claim 17, wherein the MIA includes a first network controller on a first network interface card (NIC) in the first computing system, and wherein the CMIA includes a second network controller on a second NIC in the second computing system.

19. The system of claim 18, wherein the first and second NICs also include a pre-post buffer and a TCP/IP offload engine (TOE).

20. The system of claim 18, wherein the first computing system includes a data path and a control path separate from the data path to process TCP/IP headers, a network stack partitionable across multiple processors in the first computing system, and logic to perform asynchronous low-cost copies.

21. The system of claim 17, wherein the MIA includes an active management technology (AMT) engine, basic input/output software stored in a non-volatile memory, and a memory integrity application executing on a processor in the first computing system.

22. The system of claim 17, wherein the memory in the second computing system is selected from a group consisting of a dynamic random access memory (DRAM), a non-volatile memory, and a static RAM (SRAM).

23. A method comprising:
selecting a networked client computing system with a host computing system;
determining if the networked client computing system is remote direct memory access (RMDA) ready;
transmitting an RDMA from the host computing system to the networked client computing system without intervention of an operating system executing on the host computing system in response to the networked client computing system being RDMA ready, wherein the RDMA includes a reference to a first section of a memory to perform a memory integrity test on and a test pattern of values to be written to the first section of the memory as part of the memory integrity test; and
performing an update of firmware code held on a non-volatile memory in the networked client computing system in response to the networked client computing system receiving the RDMA from the host computing system.

24. The method of claim 23, wherein selecting a networked client computing system comprises:
detecting the networked client computing system upon boot of the networked client computing system;
determining a machine address associated with the networked client computing system; and
selecting the machine address associated with the networked client computing system before performing the RDMA memory integrity function.

25. The method of claim 23, wherein determining if the networked client computing system is RDMA ready comprises:
receiving a first signal, if the networked client computing system is RDMA ready; and
receiving a second signal, if the networked client computing system is not RDMA ready.

26. The method of claim 23, wherein the non-volatile memory in the networked client computing system includes a flash memory, the firmware code includes Basic Input/Output Software, and performing an update of the firmware code held on the non-volatile memory comprises:
transmitting data to be stored in the flash memory;
flashing the flash memory to program the data into the flash memory.

* * * * *